United States Patent [19]

Washburn et al.

[11] Patent Number: 5,362,567
[45] Date of Patent: Nov. 8, 1994

[54] CARBON-CARBON COMPOSITE AND METHOD OF PREPARATION

[75] Inventors: Robert M. Washburn, Santa Clara; Jerry D. Dodson, Fremont, both of Calif.

[73] Assignee: Aerotherm Corporation, Mountain View, Calif.

[21] Appl. No.: 342,462

[22] Filed: Mar. 30, 1989

Related U.S. Application Data

[63] Continuation of Ser. No. 826,688, Feb. 6, 1986, abandoned.

[51] Int. Cl.$^5$ .............................................. B32B 9/00
[52] U.S. Cl. .................................... 428/408; 428/698; 428/908.8
[58] Field of Search .............. 428/408, 448, 698, 908.8

[56] References Cited

U.S. PATENT DOCUMENTS

| | | | |
|---|---|---|---|
| 3,459,583 | 8/1969 | Rubisch | 428/408 |
| 3,462,289 | 8/1969 | Rohl et al. | 428/408 X |
| 4,251,576 | 2/1981 | Osborn et al. | 428/220 X |
| 4,500,602 | 2/1985 | Patten et al. | 428/408 X |
| 4,535,035 | 8/1985 | Smialek et al. | 428/698 |
| 4,582,751 | 4/1986 | Vasilos et al. | 428/408 X |
| 4,598,024 | 7/1986 | Stinton et al. | 428/448 |
| 4,599,256 | 7/1986 | Vasilos | 428/408 X |
| 4,668,579 | 5/1987 | Strangman et al. | 428/408 X |
| 4,795,677 | 1/1989 | Gray | 428/408 X |
| 4,894,286 | 1/1990 | Gray | 428/408 |

*Primary Examiner*—Peter A. Nelson
*Attorney, Agent, or Firm*—Flehr, Hohbach, Test, Albritton & Herbert

[57] ABSTRACT

A carbon-carbon composite having one or more inhibitors which inhibit oxidation when the composite is exposed to high temperature.

4 Claims, No Drawings

CARBON-CARBON COMPOSITE AND METHOD OF PREPARATION

This is a continuation of application Ser. No. 826,688 filed on Feb. 6, 1986, and now abandoned.

The present invention relates to novel oxidation protected carbon-carbon composite compositions and the process for preparing the compositions. More particularly, the present invention relates to the use of combined inhibitors in carbon-carbon composites which results in compositions having excellent oxidative resistance when exposed to various high temperature environments.

There are many requirements for materials which will withstand severe thermostructural environments. For example, the tailcone components of advanced turbine engines must perform at temperatures up to about 2,600° F. The strength of metals decrease as the temperature is increased and the metal components must be made excessively heavy to carry the loads. Carbon-carbon composites have higher specific strength than refractory metals at high temperatures and the strength of carbon-carbon composites increase as the temperature increases. Therefore, carbon-carbon composites are candidate materials for the fabrication of components which must operate at high temperatures. However, carbon-carbon composites oxidize at high temperature and cannot be used without some type of oxidation protection.

Partial oxidation protection has been provided for selected applications by the application of a silicon carbide-based coating. For example, the shuttle's leading edge has a silicon carbide-based oxidation protection coating which provides the protection required for short periods of time, during the shuttle reentry and landing. However, silicon carbide coatings have pinholes and form microcracks which preclude their use for oxidation protection for extended periods of time (hundreds of hours) required for turbine engine applications.

Thus, an object of the invention is to provide oxidation protection for carbon-carbon composite compositions by incorporating oxidation inhibitors in the composition.

Another object of the present invention is to provide a process for incorporating oxidation inhibitors in a carbon-carbon composite composition in a uniform manner.

It is a further object of the present invention to provide structural carbon-carbon composite compositions which can be used for fabricating structural components.

It is still another object of the present invention to provide an oxidation inhibited formulation which can be used to join carbon-carbon composite structural components.

The foregoing and other objects are achieved by a carbon-carbon composite composition having a carbonaceous matrix containing an oxidation inhibitor and by a method of forming the composition.

Generally, carbon-carbon composites are formed by melting a pitch or pitch blend material and using it to impregnate a carbon fiber based reinforcement. Suitable reinforcements are rayon, PAN and pitch based fibrous material. The reinforcements may be in the form of fabric with various weaves such as 5 harness satin weave, 8 harness satin weave, plain weave, induction weave and the like, as well as nonwoven reinforcements. Suitable pitch or pitch blend materials are petroleum pitch, coal tar pitch, petroleum pitch heated to remove volatiles and coal tar pitch heated to remove volatiles. The pitch or pitch blend impregnated reinforcement material is often referred to as prepreg. The prepregs may be laminated by stacking and then are heated to carbonizing temperatures. After carbonization, the laminate is heated to graphitizing temperatures to yield a carbon-carbon composite matrix structure.

In accordance with the present invention oxidation inhibitors are mixed with the pitch or pitch based material. The mixture is used as a matrix precursor for the carbon-carbon composites or as a material for joining carbon-carbon composite structures. As in conventional carbon-carbon mixtures, the pitch used can be derived from either coal tar or from petroleum sources and can be used as received or thermally processed to remove volatiles to increase the char yield. The pitch based matrix precursors must be converted to a carbonaceous material when heated. The inhibitors used in the practice of the present invention are preferably boron carbide ($B_4C$), silicon carbide (SIC) or mixtures thereof. The inhibitors are in the form of finely divided particles such as a powder formed by grinding a refractory material. In the prepregnation process the mixture of oxidation inhibitors and pitch based matrix precursor or impregnating material are heated to produce a liquid containing dispersed particles of the inhibitor and the liquid mixture is then used to impregnate the reinforcing fabric to produce the prepreg. The prepreg can then be laminated and shaped to provide the shape or form desired. The laminated prepreg is heated to a carbonizing temperature to produce a composite consisting of reinforcing carbon fabric and a carbonacious matrix containing dispersed therein a mixture of the oxidation inhibitors. The carbonized laminate is then heated to graphitizing temperatures to yield an oxidation resistant carbon-carbon composite composition.

The oxidation inhibition or resistance is believed to result from the oxidation of the boron carbide and/or silicon carbide to form a molten oxide which coats the pores of the carbon matrix thereby preventing air from diffusing to the carbon matrix.

The following procedure is followed for evaluating oxidation inhibition of the carbon-carbon composites. A torch test method was developed based on ASTM E 285-70 "Oxyacetylene Ablation Testing of Thermal Insulation Materials." The experimental test conditions were calibrated to yield a heating rate of 90–100 $Btu/ft^2$-s at 2500° F. with 10 percent excess oxygen.

Baseline carbon-carbon composite oxidation data was obtained using materials fabricated without any inhibitors. A carbon-carbon composite was formed in accordance with general procedures and contained 50% by weight carbon fiber reinforcement. The ablation rate under the above conditions was approximately 2.813 inches per 15 minutes.

The following are examples of carbon-carbon composites formed in accordance with the present invention:

EXAMPLE NO. 1

Petroleum pitch is melted at about 120° C. and 12 g of silicon carbide added per 100 grams of pitch. The molten mixture is used to impregnate a unidirectional PAN-based carbon fabric to produce a prepreg. The prepreg is cut into individual plies and the plies are laminated.

The laminate is placed in a press and carbonized at 1,000° F. After carbonization, the laminate is graphitized in an induction furnace to yield a structurally sound carbon-carbon composite containing 2.44 mole percent silicon carbide inhibitor. The ablation rate is approximately 0.180 inches/15 minutes.

EXAMPLE NO. 2

A pitch is heated to remove 30 percent of the volatiles and then 11 grams of boron carbide is added per 100 grams of pitch. The molten mixture is used to produce a prepreg with a unidirectional PAN-based fabric. Prepreg plies are laminated, carbonized, and graphitized to yield a carbon-carbon composite containing 6.10 mole percent of boron carbide oxidation inhibitor. The ablation rate is approximately 0.225 inches per 15 minutes.

EXAMPLE NO. 3

The same procedure is used as described in Example 3 except that a mixed oxidation inhibitor is used. The resulting carbon-carbon composite contains 3.6 mole percent boron carbide and 10.6 mole percent silicon carbide. The ablation rate is approximately 0.024 inches per 15 minutes.

EXAMPLE NO. 4

The same procedure is used as described in Example 3 except that a mixed oxidation inhibitor is used. The resulting carbon-carbon composite contains 2.1 mole percent silicon carbide and 6.1 mole percent boron carbide. The ablation rate is approximately 0.039 inches per 15 minutes.

The following table provides data regarding Examples 5-16.

| Example | Reinforcement | Pitch | Inhibitors SiC Mole | Inhibitors $B_4C$ Percent | Oxidation Performance |
|---|---|---|---|---|---|
| 5 | PAN 8HSW | Coal tar | 15 | 44 | Excellent |
| 6 | Pitch 8HSW | Thermally treated coal tar | 17 | 49 | Excellent |
| 7 | PAN Unidirectional | Pet. Pitch | 10 | 29 | Excellent |
| 8 | Rayon 5HSW | Pet. Pitch | 30 | 22 | Excellent |
| 9 | Pitch carbon mat'l | Pet. Pitch | 25 | 18 | Excellent |
| 10 | PAN 8HSW | Pet. Pitch | 20 | 15 | Excellent |
| 11 | PAN 5HSW | Pet. Pitch | 20 | 29 | Excellent |
| 12 | PAN PW | Pet. Pitch | 10 | 15 | Excellent |
| 13 | Pitch Unidirectional | Pet. Pitch | 20 | 25 | Excellent |
| 14 | Pitch Unidirectional | Pet. Pitch | 10 | 20 | Excellent |
| 15 | Pitch Unidirectional | Pet. Pitch | 10 | 10 | Excellent |
| 16 | PAN 8HSW | Thermally treated pet. pitch | 05 | 05 | Excellent |

It is seen from the above examples that both silicon carbide and boron carbide individually provides oxidation protection. However, the combination of silicon carbide and boron carbide exhibits outstanding oxidation inhibition, greater than the combined effects of the individual inhibitors.

Thus, there has been provided an improved oxidation resistant carbon-carbon composite composition and method of preparation.

What is claimed is:

1. A carbon-carbon composite comprising a carbonaceous matrix having uniformly dispersed in the composite carbonaceous matrix at least one oxidation inhibitor.

2. The carbon-carbon composite of claim 1 in which the oxidation inhibitor is silicon carbide.

3. The carbon-carbon composite of claim 1 in which the oxidation inhibitor is boron carbide.

4. The carbon-carbon composite of claim 1 in which the oxidation inhibitor is a mixture of boron carbide and silicon carbide.

* * * * *